US009816851B2

United States Patent
Koyama

(10) Patent No.: US 9,816,851 B2
(45) Date of Patent: Nov. 14, 2017

(54) EDDY CURRENT MOLD LEVEL MEASURING DEVICE AND MOLD LEVEL MEASURING METHOD

(71) Applicant: NIRECO CORPORATION, Tokyo (JP)

(72) Inventor: Fumio Koyama, Tokyo (JP)

(73) Assignee: NIRECO CORPORATION, Tokyo (JP)

( * ) Notice: Subject to any disclaimer, the term of this patent is extended or adjusted under 35 U.S.C. 154(b) by 177 days.

(21) Appl. No.: 14/809,582

(22) Filed: Jul. 27, 2015

(65) Prior Publication Data

US 2016/0033318 A1   Feb. 4, 2016

(30) Foreign Application Priority Data

Aug. 1, 2014   (WO) .................. PCT/JP2014/070340
Feb. 12, 2015  (JP) ................................. 2015-024950

(51) Int. Cl.
*G01F 25/00* (2006.01)
*B22D 11/18* (2006.01)
(Continued)

(52) U.S. Cl.
CPC .......... *G01F 25/0076* (2013.01); *B22D 11/16* (2013.01); *B22D 11/186* (2013.01);
(Continued)

(58) Field of Classification Search
CPC .... G01F 25/0076; G01F 23/26; G01F 23/261; B22D 11/16; B22D 11/186; B22D 11/205
See application file for complete search history.

(56) References Cited

U.S. PATENT DOCUMENTS 4,647,854 A    3/1987  Yamada et al.
2014/0372062 A1  12/2014  Arai et al.

FOREIGN PATENT DOCUMENTS

JP    56-129819 A    10/1981
JP    60-216959 A    10/1985
(Continued)

OTHER PUBLICATIONS

English Machine Translation of Nobutaka et al., JP 2013-166167 A, Aug. 29, 2013, Filed Feb. 15, 2012, Translated Mar. 2017.*
(Continued)

*Primary Examiner* — Hezron E Williams
*Assistant Examiner* — David Z Huang
(74) *Attorney, Agent, or Firm* — Squire Patton Boggs (US) LLP

(57) ABSTRACT

The measuring device includes: a detecting section including a coil which detects a change in a value of impedance caused by a change in a mold level; an amplifying section which amplifies an output of the detecting section; a pre-pouring calibration section which determines a reference value of a positive feedback ratio of the amplifying section in environmental conditions before pouring of molten metal; and a mold oscillation signal calibration section which obtains a standard value of difference in an output of the measuring device, the standard value of difference corresponding to a known value of amplitude of mold oscillation when the positive feedback ratio is the reference value, obtains a deviation of measurement based on a difference between the maximum value and the minimum value of the output in mold oscillation and the standard value, and corrects the positive feedback ratio within a predetermined range including the reference value.

5 Claims, 7 Drawing Sheets

(51) Int. Cl.
    *G01F 23/26*     (2006.01)
    *B22D 11/16*     (2006.01)
    *B22D 11/20*     (2006.01)

(52) U.S. Cl.
    CPC ............ *B22D 11/205* (2013.01); *G01F 23/26* (2013.01); *G01F 25/0061* (2013.01)

(56) References Cited

FOREIGN PATENT DOCUMENTS

| | | |
|---|---|---|
| JP | 61-239120 A | 10/1986 |
| JP | 63-111248 U | 7/1988 |
| JP | 02-140621 A | 5/1990 |
| JP | 08-233632 A | 9/1996 |
| JP | 2007-021529 A | 2/2007 |
| JP | 2013-166167 A | 2/2013 |
| JP | 5463440 B1 | 4/2014 |

OTHER PUBLICATIONS

International Search Report & Written Opinion dated Oct. 21, 2014 corresponding to International Patent Application No. PCT/JP2014/070340.
European Search Report application No. 15176759.7 dated Dec. 11, 2015.

\* cited by examiner

EDDY CURRENT MOLD LEVEL MEASURING DEVICE AND MOLD LEVEL MEASURING METHOD

TECHNICAL FIELD

The present invention relates to an eddy current mold level measuring device and a mold level measuring method, which are used in continuous casting equipment.

BACKGROUND ART

In continuous casting equipment, molten metal is poured into a mold, cooled and solidified there, such that a desired shape of strand is produced. In continuous casting equipment, measurement and control of a level of a surface of molten metal in the mold, that is, a mold level are essential for improving quality of a produced strand.

Eddy current mold level measuring devices measure a level of a surface of molten metal in the mold by the use of the phenomenon that magnitude of voltage which is induced in a detecting coil by eddy current generated around a surface of molten metal in the mold varies depending on a distance between the detecting coil and the surface of molten metal. Eddy current mold level measuring devices are excellent in responsivity and therefore appropriate for a high-accuracy control of a level of a surface of molten metal in the mold, but are susceptible to ambient temperature and electromagnetic field which surrounds the devices. Accordingly, calibration is essential to eddy current mold level measuring devices. As methods for calibrating conventional eddy current mold level measuring devices, a method which uses measurements obtained by visual observations of the operator (for example, JPS61239120(A)), a method which uses a thermocouple type mold level meter (for example, JPH02140621(A)), a method which uses an electrode type mold level meter (for example, JPH08233632(A)), and the like have been developed. However, any of the above-described methods are insufficient in accuracy and are not adaptable to dynamic disturbances such as a change in vertical position of a tundish and a change in width of a slab mold. In particular, in the case of small-section molds, such as those for bloom and billet, eddy current mold level measuring devices are significantly affected by a change in vertical position of the tundish, and the change in vertical position of the tundish has been an obstacle to improvement of accuracy of the measuring devices.

Further, a method in which characteristics of a mold level measuring device are determined by the use of signals generated by mold oscillation has been proposed (JPS60216959(A)). However, the method disclosed in JPS60216959(A) has problems as described below. Since mold level measuring devices are used for control of pouring rate of molten metal into the mold, an error in measurement may lead to a serious accident. Accordingly, when calibration of a mold level measuring device is carried out for the duration of continuous casting process, safety and reliability of the calibration has to be ensured. However, JPS60216959(A) does not say anything about how calibration of a mold level measuring device should be carried out while safety and reliability of the calibration are ensured for the duration of continuous casting process. Accordingly, the method disclosed in JPS60216959(A) cannot be brought into practical use in calibration for the duration of continuous casting process. In the method disclosed in JPS60216959(A), feed-forward-type correction is made by a correction circuit 12 as shown in FIG. 4, and a positive feedback ratio is not corrected unlike the present invention. The present invention will be described in detail later.

Thus, any of the conventional methods cannot provide a sufficient degree of accuracy of measurement while adapting to changes in surrounding conditions in the continuous casting process.

Patent document 1: JPS61239120(A)
Patent document 2: JPH02140621(A)
Patent document 3: JPH08233632(A)
Patent document 4: JPS60216959(A)

Accordingly, there is a need for an eddy current mold level measuring device and a mold level measuring method in which calibration of the mold level measuring device can be carried out while safety and reliability of the calibration are ensured for the duration of continuous casting process and a sufficient accuracy of measurement can be guaranteed.

SUMMARY OF INVENTION

An eddy current mold level measuring device according to a first aspect of the present invention measures a level of molten metal in a mold. The mold level measuring device includes: a detecting section including a coil configured to detect a change in a value of impedance caused by a change in a mold level; an amplifying section configured to amplify an output of the detecting section; a pre-pouring calibration section configured to determine a reference value of a positive feedback ratio of the amplifying section in environmental conditions before pouring of molten metal; and a mold oscillation signal calibration section configured to obtain a standard value of difference in an output of the measuring device, the standard value of difference corresponding to a known value of amplitude of mold oscillation when the positive feedback ratio is the reference value, to obtain a deviation of measurement based on a difference between the maximum value and the minimum value of the output of the measuring device during a time period of mold oscillation and the standard value of difference, and to correct the positive feedback ratio within a predetermined range including the reference value.

The eddy current mold level measuring device according to the present aspect achieves a high accuracy, because calibration is carried out using an amount of a change in the output of the eddy current mold level measuring device and the known value of amplitude of mold oscillation. Further, since the calibration is carried out by the use of the output of the eddy current mold level measuring device itself, other types of level measuring devices such as a thermocouple type mold level meter and an electrode type mold level meter are not required.

Further, the deviation of measurement is obtained based on the reference value of the positive feedback ratio determined by pre-pouring calibration. Accordingly, calibration of the mold level measuring device can be carried out while safety and reliability of the calibration is ensured.

An eddy current mold level measuring device according to a first embodiment of the first aspect of the present invention, further includes a display section configured to display the deviation of measurement.

According to the eddy current mold level measuring device according to the present embodiment, the operator can recognize the deviation of measurement of the measuring device by the display section for the duration of the continuous casting process.

An eddy current mold level measuring device according to a second embodiment of the first aspect of the present invention, is configured to change the predetermined range depending on a period of mold oscillation.

According to the present embodiment, for example, in the case of a longer period of mold oscillation, the above-described predetermined range is made narrower than in the case of a shorter period of mold oscillation, and thereby calibration can be carried out with greater safety.

In an eddy current mold level measuring device according to a third embodiment of the first aspect of the present invention, the mold oscillation signal calibration section is further configured to reset the positive feedback ratio to the reference value when the deviation of measurement does not come into a predetermined range within a predetermined time period after the mold oscillation signal calibration section has corrected the positive feedback ratio.

In the eddy current mold level measuring device according to the present embodiment, the positive feedback ratio is once reset to the reference value and then calibration is continued when an amount of the deviation of measurement becomes relatively great, and thereby calibration using the amount of the deviation can be completed in a shorter time.

In an eddy current mold level measuring device according to a fourth embodiment of the first aspect of the present invention, the mold oscillation signal calibration section is further configured to successively obtain the difference between the maximum value and the minimum value of the output of the measuring device and the deviation of measurement during the time period of mold oscillation.

The eddy current mold level measuring device according to the present embodiment permits successively repeated calibration through a time period of withdrawal in the continuous casting process. Accordingly, the mold level measuring device is sufficiently adaptable to dynamic disturbances such as a change in vertical position of the tundish and a change in width of a slab mold.

In an eddy current mold level measuring device according to a fifth embodiment of the first aspect of the present invention, the mold oscillation signal calibration section is further configured to receive a signal which represents a cyclic movement of mold oscillation from the outside and to determine a time period in which calibration using mold oscillation is to be carried out, according to the signal which represents the cyclic movement of mold oscillation.

The eddy current mold level measuring device according to the present embodiment is capable of appropriately determining the time of start and the time of completion of calibration during a time period of mold oscillation with reference to the signal which has been received from the outside and which represents the cyclic movement of mold oscillation. The signal which represents the cyclic movement of mold oscillation includes a signal which is proportional to the cyclic movement of mold oscillation and a signal which is antiphase with the mold oscillation.

In an eddy current mold level measuring device according to a sixth embodiment of the first aspect of the present invention, the mold oscillation signal calibration section is further configured to determine the value of amplitude of mold oscillation based on an input from the outside.

The eddy current mold level measuring device according to the present embodiment determines the value of amplitude of mold oscillation based on the input from the outside and carries out calibration using the value of amplitude, and thereby realizes a high accuracy.

An eddy current mold level measuring device according to a seventh embodiment of the first aspect of the present invention, further includes a filter configured to detect components of mold oscillation alone, and the mold oscillation signal calibration section is further configured to use signals which have passed through the filter when obtaining the difference between the maximum value and the minimum value of the output of the measuring device during the time period of mold oscillation.

The eddy current mold level measuring device according to the present embodiment uses signals which have passed through the filter configured to detect components of mold oscillation alone, and thereby an influence of disturbance caused by fluctuations of the surface of the molten metal besides fluctuations due to mold oscillation can be removed.

A mold level measuring method according to a second aspect of the present invention is used to measure a level of molten metal in a mold by an eddy current mold level measuring device. The method includes the steps of: determining a reference value of a positive feedback ratio of an amplifying section in environmental conditions before pouring of molten metal into the mold; detecting, by a coil, a change in a value of impedance caused by a change in mold level; amplifying, by the amplifying section, a voltage corresponding to the change in the value of impedance; obtaining a standard value of difference in an output of the measuring device, the standard value of difference corresponding to a known value of amplitude of mold oscillation when the positive feedback ratio is the reference value, to obtain a deviation of measurement based on a difference between the maximum value and the minimum value of the output of the measuring device during a time period of mold oscillation and the standard value of difference; and correcting the positive feedback ratio so as to reduce the deviation of measurement while the positive feedback ratio is maintained within a predetermined range including the reference value.

The mold level measuring method according to the present aspect achieves a high accuracy, because calibration is carried out using an amount of a change in the output of the eddy current mold level measuring device and a known value of amplitude of mold oscillation. Further, since the calibration is carried out by the use of output of the eddy current mold level measuring device itself, other types of level measuring devices such as a thermocouple type mold level meter and an electrode type mold level meter are not required.

Further, the deviation of measurement is obtained based on the reference value of the positive feedback ratio determined by pre-pouring calibration. Accordingly, calibration of the mold level measuring device can be carried out while safety and reliability of the calibration is ensured.

In a mold level measuring method according to a first embodiment of the second aspect of the present invention, the predetermined range is changed depending on a period of mold oscillation.

According to the present embodiment, for example, in the case of a longer period of mold oscillation, the above-described predetermined range is made narrower than in the case of a shorter period of mold oscillation, and thereby calibration can be carried out with greater safety.

In a mold level measuring method according to a second embodiment of the second aspect of the present invention, the positive feedback ratio is reset to the reference value when the deviation of measurement does not come into a predetermined range within a predetermined time period after the positive feedback ratio has been corrected.

In the mold level measuring method according to the present embodiment, the positive feedback ratio is once reset to the reference value and then calibration is continued when an amount of the deviation of measurement becomes relatively great, and thereby calibration for the amount of the deviation can be completed in a shorter time.

In a mold level measuring method according to a third embodiment of the second aspect of the present invention, the difference between the maximum value and the minimum value of the output of the measuring device and the deviation of measurement are successively obtained during the time period of mold oscillation.

The mold level measuring method according to the present embodiment permits successively repeated calibration through the time period of withdrawal in the continuous casting process. Accordingly, the mold level measuring method is sufficiently adaptable to dynamic disturbances such as a change in vertical position of the tundish and a change in width of a slab mold.

DESCRIPTION OF EMBODIMENTS

Figure 1:
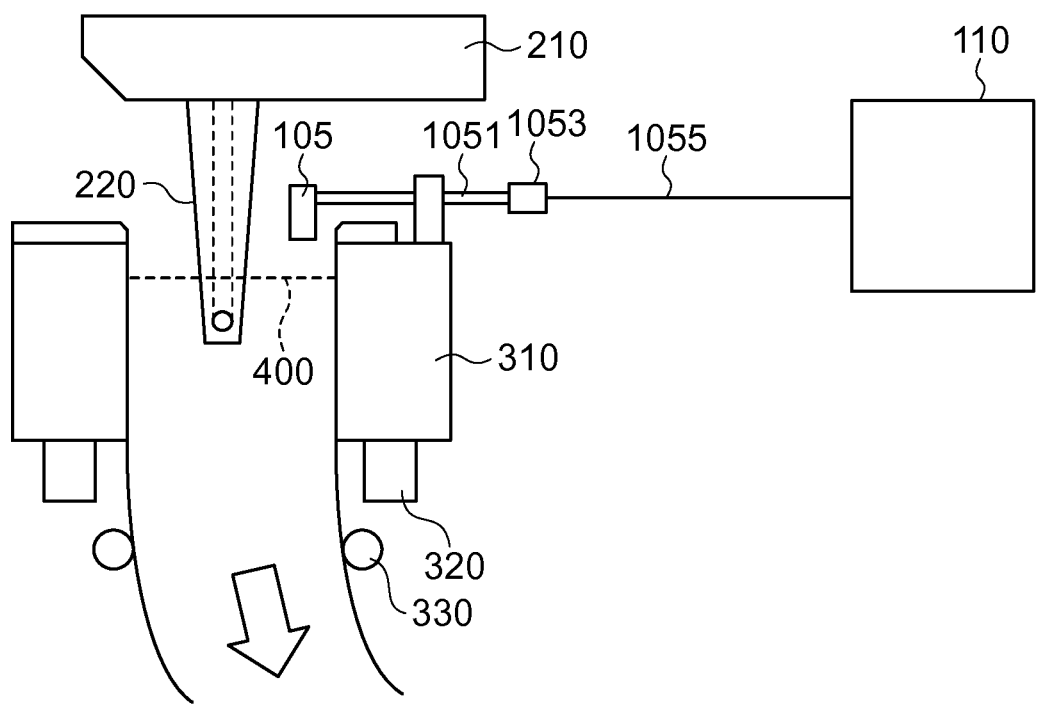
FIG. 1 shows an arrangement of continuous casting equipment.

FIG. 1 shows an arrangement of continuous casting equipment.

Molten metal such as molten steel stored in a tundish 210 is poured into a mold 310 through an immersion nozzle 220, made to solidify in the mold 310 and delivered from the mold 310 through the use of pinch rolls 330. Further, the mold 310 is equipped with a mold oscillation device 320. Mold oscillation will be described later.

When in a certain time period an amount of molten metal which is poured into the mold 310 is greater than an amount of metal which is delivered from the mold 310, a level of a surface 400 of the molten metal in the mold 310 goes up. On the other hand, when in a certain time period an amount of metal which is delivered from the mold 310 is greater than an amount of molten metal which is poured into the mold 310, the level of the surface 400 of the molten metal in the mold 310 goes down. Under the above-described situation, an eddy current mold level measuring device according to an embodiment of the present invention measures the level of the surface 400 of the molten metal in the mold 310. The eddy current mold level measuring device according to the present embodiment includes a detecting section 105 and a signal processing section 110. The detecting section 105 and the signal processing section 110 are connected to each other by a cable 1055. Since the detecting section 105 is located near the molten metal, a joint section 1053 and air piping 1051 are provided to supply cooling air to the detecting section 105.

Figure 2:
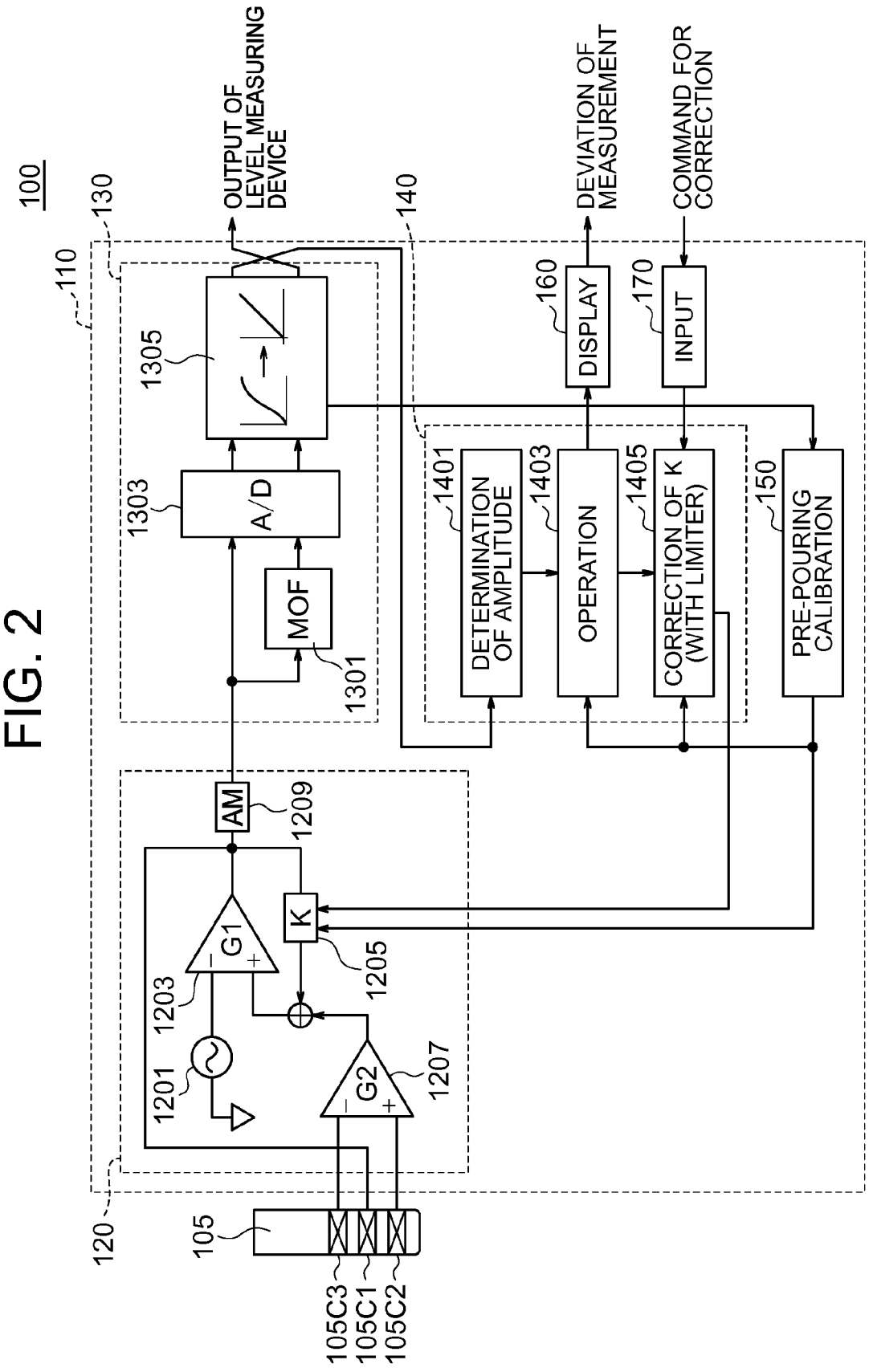
FIG. 2 is a block diagram of the eddy current mold level measuring device according to an embodiment of the present invention.

FIG. 2 is a block diagram of the eddy current mold level measuring device 100 according to an embodiment of the present invention. As described above, the eddy current mold level measuring device 100 includes the detecting section 105 and the signal processing section 110. The detecting section 105 includes an exciting coil 105C1, a detecting coil 105C2 and a reference coil 105C3. The signal processing section 110 includes a signal amplifying section 120, an output generating section 130, a mold oscillation signal calibration section 140, a pre-pouring calibration section 150, a display section 160 and an input section 170.

In the detecting section 105, current of a predetermined frequency is send through the exciting coil 105C1, so that the exciting coil 105C1 generates an AC magnetic field. The AC magnetic field passes through the detecting coil 105C2 and the reference coil 105C3. Further, when the AC magnetic field interacts with molten metal existing within a predetermined distance, eddy current is generated in the molten metal, and in reaction to the generated eddy current impedance of the detecting coil 105C2 will change. An amount of the change in impedance of the detecting coil 105C2 varies depending on a distance between the detecting coil 105C2 and the surface of the molten metal. Accordingly, the distance between the detecting coil 105C2 and the surface of the molten metal can be measured by measuring the amount of the change in impedance of the detecting coil 105C2. Further, if an amount of a change in difference between impedance of the detecting coil 105C2 and impedance of the reference coil 105C3 is used instead of the amount of a change in impedance of the detecting coil 105C2, influence of temperature and electromagnetic field which surrounds the device can be reduced. In the present embodiment, the signal amplifying section 120 employs the amount of a change in difference between impedance of the detecting coil 105C2 and impedance of the reference coil 105C3. However, the present invention can be applied to any types of eddy current mold level measuring devices besides the difference type to which the present embodiment belongs.

The signal amplifying section 120 includes a reference oscillator 1201 for generating AC voltage of a predetermined frequency and of a predetermined amplitude, a feedback amplifier 1203, a feedback impedance 1205 having a variable positive feedback ratio, a differential amplifier 1207 receiving a difference between impedance of the detecting coil 105C2 and impedance of the reference coil 105C3 as input, and an amplitude modulator 1209 for amplitude modulation of AC voltage of output of the feedback amplifier 1203. When output voltage of the reference oscillator 1201 is represented as Vin, output voltage of the feedback amplifier 1203 is represented as Vout, an amplification factor of the feedback amplifier 1203 is represented as G1, an amplification factor of the differential amplifier 1207 is represented as G2, the positive feedback ratio is represented as K, and a level of the molten metal is represented as h, the following equation holds.

$$V_{out} = \frac{-G1 \times V_{in}}{1 - G1(K + G2 \times f(h))} \quad (1)$$

"f" represents a function of the level h of molten metal. When the level h of the molten metal rises and therefore a distance between the detecting coil 105C2 and the surface of the molten metal becomes smaller, "f" becomes greater in Equation (1). Accordingly, when the level h of the molten metal rises, an absolute value of output voltage $|V_{out}|$ of the feedback amplifier 1203 becomes smaller according to Equation (1).

Calibration of the eddy current mold level measuring device will be described below. As described above, the eddy current mold level measuring device detects a change in impedance of the detecting coil 105C2 caused by a change in the level h of the surface of the molten metal in the mold 310, using Equation (1). However, impedance of the detecting coil 105C2 will vary depending not only on the level of the surface of the molten metal, but also on temperature and electromagnetic field which surrounds the device. Accordingly, for measurement using the eddy current mold level measuring device, calibration of the eddy current mold level measuring device is required.

Figure 3:
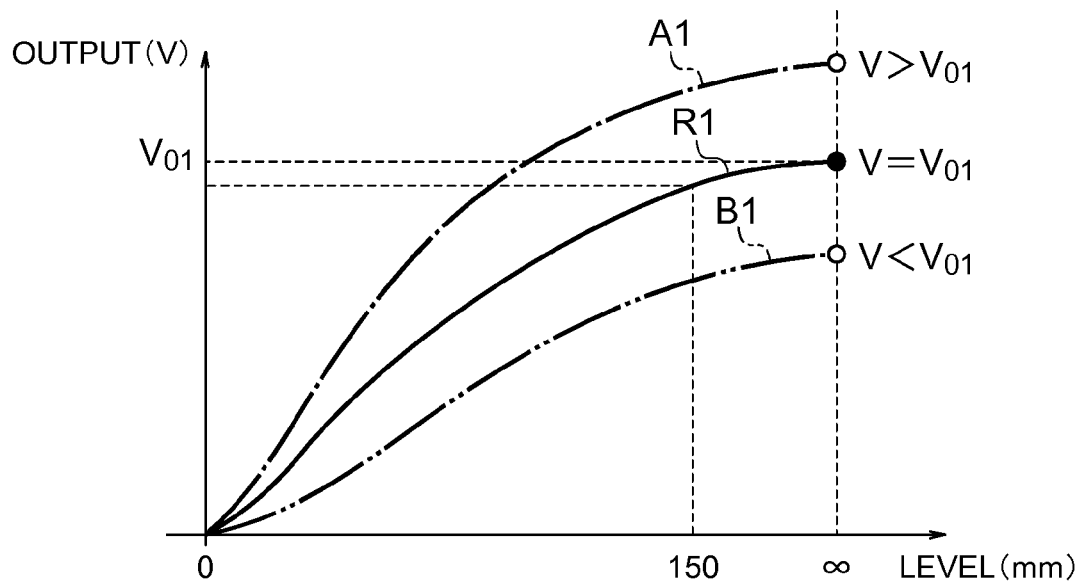
FIG. 3 illustrates a method of calibration of the eddy current mold level measuring device.

FIG. 3 illustrates a method of calibration of the eddy current mold level measuring device. Calibration of the eddy current mold level measuring device includes a calibration using a calibration plate and a calibration which is carried out before molten metal is poured into the mold.

The calibration using a calibration plate is carried out independently of the continuous casting process. In the calibration using a calibration plate, the output voltage of the feedback amplifier 1203 is measured and recorded while distance between the detecting coil 105C2 and the calibration plate is changed. The horizontal axis of FIG. 3 represents level of the surface of the molten metal or of the calibration plate. The level is represented by distance between the detecting coil 105C2 and the surface of the molten metal or the calibration plate. Level of 0 means the state in which the distance between the detecting coil 105C2 and the surface of the molten metal or the calibration plate is 0. The vertical axis of FIG. 3 represents the output voltage of the feedback amplifier 1203. The solid line R1 in FIG. 3 shows the result of the calibration using a calibration plate. Assuming that the measuring range of the eddy current mold level measuring device is from 0 to 150 millimeters, values of the output voltage which correspond to values of distance between the detecting coil 105C2 and the calibration plate in the above described range are measured as shown in FIG. 3. Further, a value $V_{01}$ of the output voltage is measured when the calibration plate is removed or in other words, the calibration plate is located at an infinite distance from the detecting coil 105C2. This value $V_{01}$ of the output voltage is referred to as reference voltage. The positive feedback ratio K is adjusted when necessary such that a shape of the solid line R1 is appropriately determined.

The calibration which is carried out before molten metal is poured into the mold is carried out for the duration of continuous casting process by the pre-pouring calibration section 150. The pre-pouring calibration section 150 records a value which is obtained by a linearizer which has processed the output voltage of the feedback amplifier 1203, before molten metal is poured into the mold. The calibration which is carried out before molten metal is poured into the mold may be carried out by the command of the operator. The state before molten metal is poured into the mold corresponds to the state in which the calibration plate is at an infinite distance from the detecting coil 105C2. Accordingly, a value of the output voltage of the feedback amplifier 1203, which is measured before molten metal is poured into the mold should be equal to the above-described reference voltage $V_{01}$. In practice, however, temperature and electromagnetic field which surrounds the device vary according to casting conditions, and therefore the measured value of the output voltage is not necessarily equal to the reference voltage $V_{01}$. In FIG. 3, the dot-dash line A1 shows the case in which a value of the output voltage V, which is measured before molten metal is poured into the mold is greater than $V_{01}$, while the dot-dot-dash line B1 shows the case in which a value of the output voltage V, which is measured before molten metal is poured into the mold is smaller than $V_{01}$. In these cases, the pre-pouring calibration section 150 adjusts the positive feedback ratio K in Equation (1) such that the output voltage V is equal to the reference voltage $V_{01}$. More specifically, in the case of the dot-dash line A1, the positive feedback ratio K is increased such that the output V of the level measuring device is made smaller and in agreement with $V_{01}$. In the case of dot-dot-dash line B1, the positive feedback ratio K is reduced such that the output V of the level measuring device is made greater and in agreement with $V_{01}$. The calibration which is carried out before molten metal is poured into the mold is performed for each casting process.

As described later, the value of positive feedback ratio, which has been determined by the pre-pouring calibration section 150 is used as the reference value.

Figure 4:
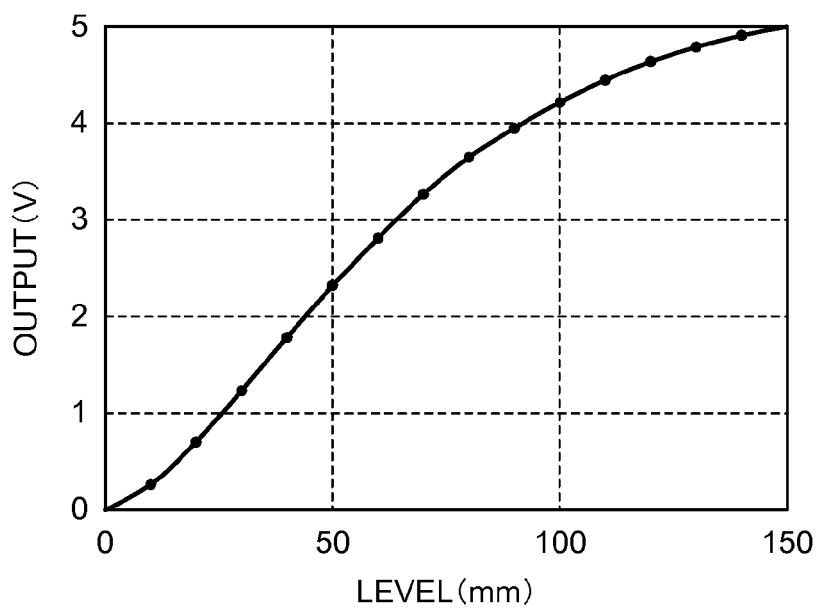
FIG. 4 shows a relationship between level of the surface in the mold (that is, mold level) and the output voltage of the feedback amplifier.

FIG. 4 shows a relationship between level of the surface in the mold (that is, mold level) and the output voltage of the feedback amplifier 1203. The horizontal axis of FIG. 4 represents mold level while the vertical axis represents output voltage of the feedback amplifier 1203. The position of the detecting coil 105C2 is designated as 0 of mold level.

The output generating section 130 shown in FIG. 2 includes a mold oscillation filter (MOF) 1301, an analog-to-digital converter 1303, and a linearizer 1305. The linearizer 1305 performs linearization between output of the level measuring device and mold level such that a ratio between an amount of change in output of the level measuring device and an amount of change in mold level is constant. Two types of signals, one of which has not passed through the mold oscillation filter 1301 and the other of which has passed through the mold oscillation filter 1301 are delivered to the analog-to-digital converter 1303 as inputs. Outputs of the analog-to-digital converter 1303, which correspond to the two types of signals are delivered to the linearizer 1305. Among the outputs of the analog-to-digital converter 1303, which correspond to the two types of signals, the output which corresponds to the signal which has passed through the mold oscillation filter 1301 serves as an output of the mold level measuring device. Among the outputs of the analog-to-digital converter 1303, which correspond to the two types of signals, the output which corresponds to the signal which has not passed through the mold oscillation filter 1301 is used by the mold oscillation signal calibration section 140. The mold oscillation signal calibration section 140 includes an amplitude determining section 1401, an operation section 1403 and a positive feedback ratio correcting section 1405. The function of the mold oscillation signal calibration section 140 will be described later.

Figure 5:
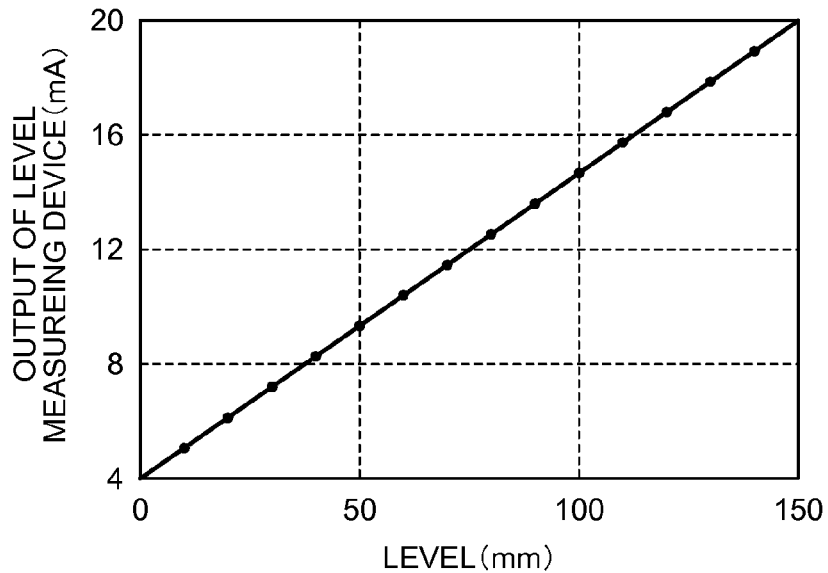
FIG. 5 shows a relationship between mold level and output of the mold level measuring device.

FIG. 5 shows a relationship between mold level and output of the mold level measuring device. Output of the mold level measuring device is obtained by having the output of the feedback amplifier 1203 undergo linearization by the linearizer 1305. The horizontal axis of FIG. 5 represents mold level while the vertical axis of FIG. 5 represents output of the eddy current mold level measuring device.

Figure 6:
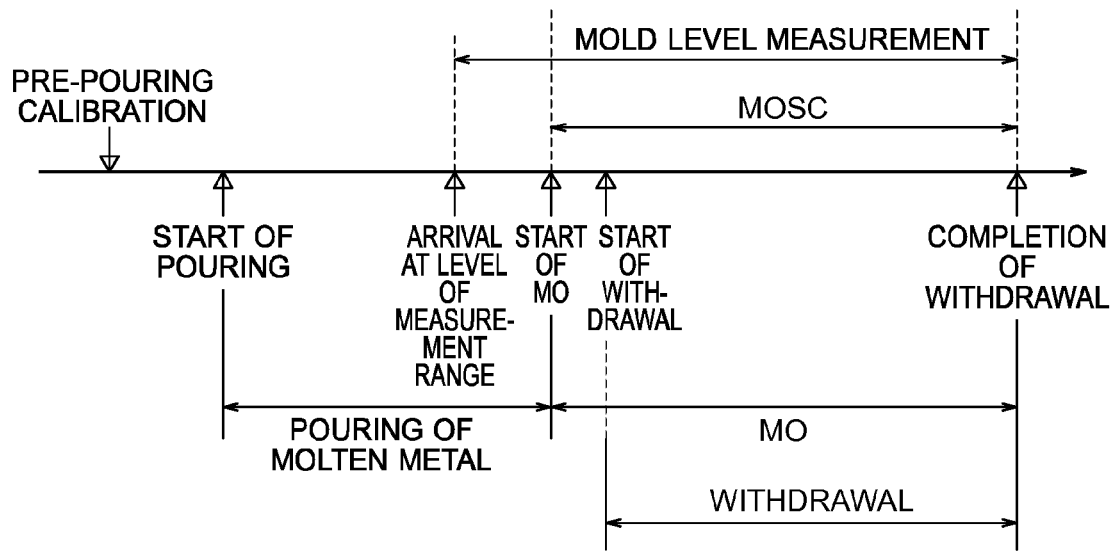
FIG. 6 illustrates the continuous casting process.

FIG. 6 illustrates the continuous casting process. The continuous casting process includes a step of pouring in which molten metal is fed from the tundish 210 into the mold 310 until the surface 400 of molten metal in the mold 310 rises to a predetermined level and a step of withdrawal in which solidified metal is withdrawn from the mold 310 while molten metal is being fed from the tundish 210 into the mold. In the step of pouring, a dummy bar is installed in the mold such that it forms the bottom, molten metal is stored in a space surrounded by the mold 310 and the dummy bar while it is being solidified and the surface of the molten metal, that is, the mold level rises. When the mold level reaches a predetermined level, the process goes to the step of withdrawal. Withdrawal means withdrawing metal in the form of plates, bars and the like which has been solidified in the mold 310 from the mold 310 by the use of pinch rolls 330 installed in the lower part of the mold 310. Before the start of the withdrawal, powder which prevents oxidation of the surface of the molten metal and functions as a lubricant between the solidified metal and the mold is sprayed onto the surface of the molten metal. Further, by the mold oscillation device 320 shown in FIG. 1, mold oscillation (MO) in which the mold 310 is made to oscillate in the vertical direction is started. An amplitude (stroke) of mold oscillation is from 2 millimeters to 6 millimeters while a period of mold oscillation is from 30 cycles to 450 cycles per minute. The withdrawal is started after the mold oscillation has been started, and the mold oscillation continues while the withdrawal is being carried out.

As shown in FIG. 6, before the start of pouring of molten metal into the mold 310, the above-described pre-pouring calibration of the mold level measuring device is carried out. After the start of pouring of molten metal into the mold 310, the level of the molten metal in the mold 310 rises. After the level of the molten metal in the mold 310 has reached the measuring range of the mold level measuring device 100, measurement of the mold level is carried out by the mold level measuring device 100. Further, for the duration of mold oscillation, mold oscillation signal calibration (MOSC) is carried out. The mold oscillation signal calibration will be described later.

The output generating section 130 receives a signal which is proportional to the cyclic movement of mold oscillation from a controller which is not shown in FIG. 1, of the mold oscillation device 320 shown in FIG. 1. The output generating section 130 changes a rejection band of the mold oscillation filter 1301 according to the cycle (the frequency) of the above-described signal. The mold oscillation filter 1301 eliminates an influence of movement of the surface of the molten metal caused by the mold oscillation, on the output of the mold level measuring device by removing components of mold oscillation from the output of the signal amplifying section 120. Further, the influence of movement of the surface of the molten metal caused by the mold oscillation may be removed by an adder in place of the mold oscillation filter 1301. The adder is used to add a signal which is antiphase with the mold oscillation, and which has been received from the controller to the output of the signal amplifying section 120 such that components of mold oscillation therein can be eliminated. Thus, in place of the signal which is proportional to the cyclic movement of mold oscillation, which is used in the present embodiment, the signal which is antiphase with the mold oscillation can also be used in another embodiment.

Figure 7:
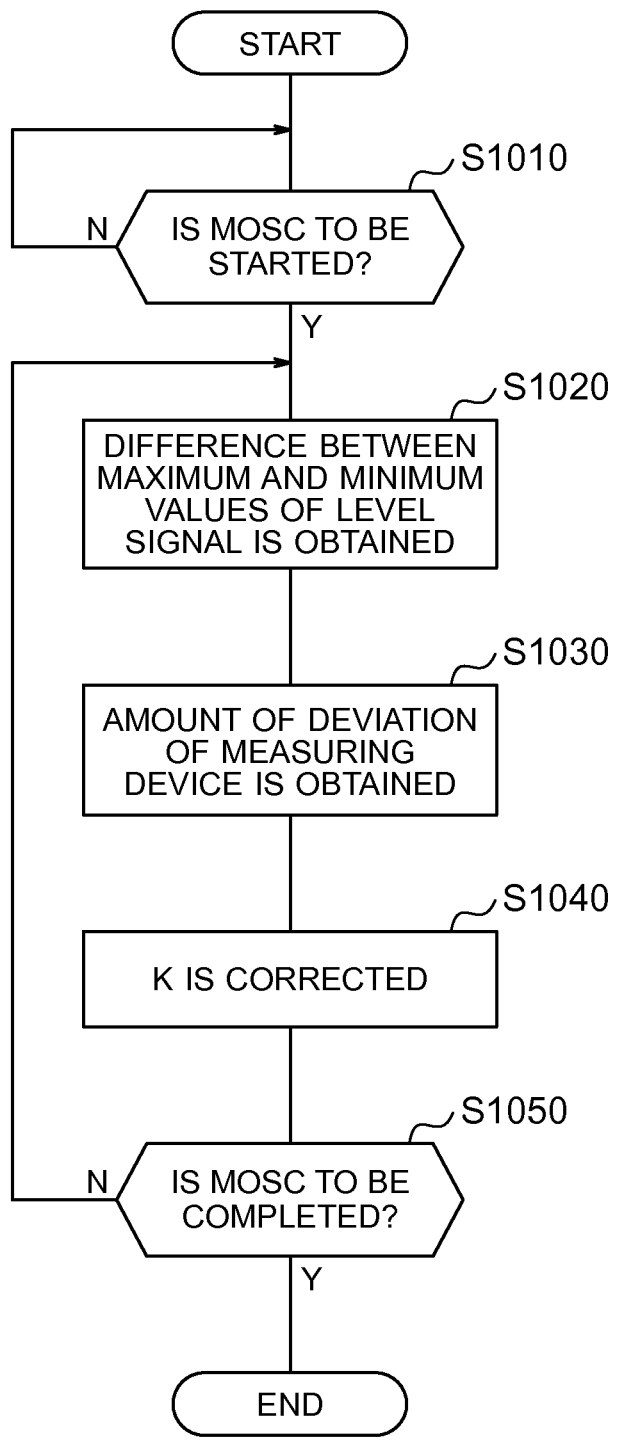
FIG. 7 is a flowchart for illustrating mold oscillation signal calibration (MOSC)

FIG. 7 is a flowchart for illustrating mold oscillation signal calibration carried out by the mold oscillation signal calibration section 140 of the eddy current mold level measuring device 100.

In step S1010 of FIG. 7, the mold oscillation signal calibration section 140 determines whether the MOSC is should be started or not. If the MOSC is started, the process goes to step S1020. If the MOSC is not started, the process goes on standby. The mold oscillation signal calibration section 140 determines the point in time when the MOSC is started, by the use of the above-described signal which is proportional to the cyclic movement of mold oscillation or the signal which is antiphase with the mold oscillation. In the steady state, the frequency of fluctuations of the molten metal surface (the surface of the molten metal) is from 0.1 Hz to 0.5 Hz. Accordingly, the mold oscillation signal calibration section 140 may be configured to start the MOSC when a high-pass filter or a band-pass filter which has a pass band corresponding to the frequency of mold oscillation detects components of mold oscillation and the amplitude of the components is greater than a predetermined value. Further, the output of the above-described filter may be used in the following steps.

In step S1020 of FIG. 7, the amplitude determining section 1401 of the mold oscillation signal calibration section 140 obtains and updates the maximum value and the minimum value of the output of the mold level measuring device 100. For example, the amplitude determining section 1401 can be configured such that it obtains the maximum value and the minimum value in a time period from the point in time which precedes the point of updating by a predetermined period to the point of updating. The predetermined period is determined to be longer than the period of mold oscillation. The amplitude determining section 1401 configured as described above is able to successively obtain the maximum value and the minimum value even when at least one of the maximum value and the minimum value changes. The amplitude determining section 1401 obtains a difference between the maximum value and the minimum value as a measurement of amplitude.

In step S1030 of FIG. 7, the operation section 1403 of the mold oscillation signal calibration section 140 obtains a deviation of measurement by the use of the above-described measurement of amplitude and the known value of amplitude of mold oscillation. As described above, the value of amplitude of mold oscillation varies in the range from 2 millimeters to 6 millimeters depending on an object to be casted. Accordingly, the operation section 1403 may obtain the value of amplitude of mold oscillation by the use of the signal which is proportional to the cyclic movement of mold oscillation or the signal which is antiphase with mold oscillation. Alternatively, the operation section 1403 may receive the value of amplitude of mold oscillation for each casting process from the outside, such as the controller and the operator. By way of example, the deviation of measurement can be represented by a ratio of a difference in the output of the measuring device, which corresponds to the above-described measurement of amplitude to a difference in the output of the measuring device, which corresponds to the known value of amplitude of mold oscillation and which is obtained in the case that the positive feedback ratio is the reference value. When the above-described ratio is 1, there is no deviation of measurement. In other words, the measuring device in which the positive feedback ratio is the reference value can be judged to be functioning appropriately. The greater a difference between the above-described ratio and 1, the greater the deviation of measurement is. A relationship between the above-described ratio and positive feedback ratio will be described later.

The operation section 1403 may be configured such that it sends the above-described ratio which represents the deviation of measurement to the display section 160, by which the deviation of measurement is displayed to the operator.

Further, the operation section 1403 obtains a theoretically corrected value of positive feedback ratio, which makes the above-described measurement of amplitude equal to the known value of amplitude of mold oscillation.

Figure 8:
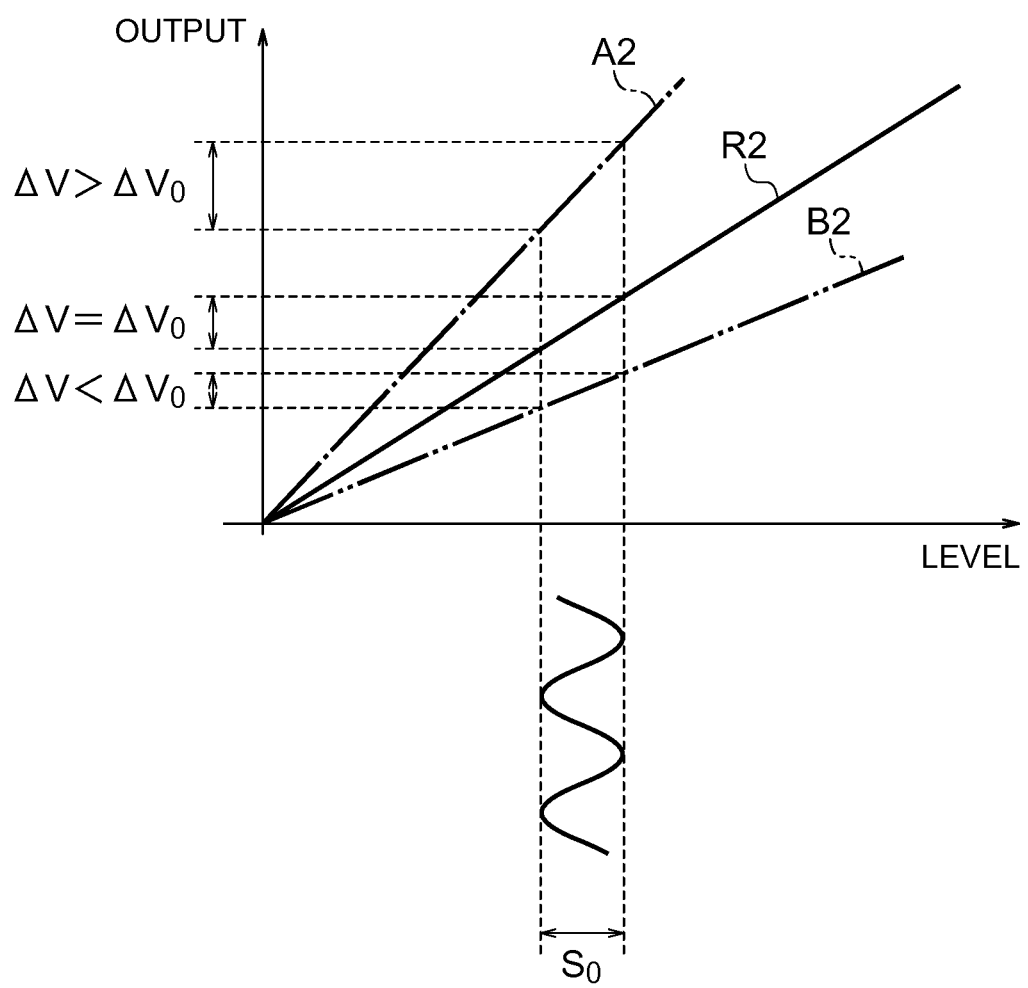
FIG. 8 illustrates how the theoretically corrected value of positive feedback ratio is determined in step S1030 of FIG. 7.

FIG. 8 illustrates how the theoretically corrected value of positive feedback ratio is determined in step S1030 of FIG. 7. The known value of amplitude is represented as $S_0$. As to the solid line R2 in FIG. 8, a difference $\Delta V$ in the output of the level measuring device, which corresponds to the known value of amplitude $S_0$ is equal to $\Delta V_0$. When the relationship represented by the solid line R2 shown in FIG. 8 holds, the positive feedback ratio is equal to the reference value. In other words, the difference $\Delta V_0$ corresponds to the case in which the positive feedback ratio is equal to the reference value. The difference $\Delta V_0$ is referred to as a standard value of difference in the output of the measuring device. As to the dot-dash line A2 in FIG. 8, the difference $\Delta V$ in the output of the level measuring device, which corresponds to the known value of amplitude $S_0$ is greater than $\Delta V_0$. As to the dot-dot-dash line B2 in FIG. 8, the difference $\Delta V$ in the output of the level measuring device, which corresponds to the known value of amplitude $S_0$ is smaller than $\Delta V_0$. In the case of the dot-dash line A2, the theoretically corrected value of positive feedback ratio is made greater than the reference value such that the difference $\Delta V$ in the output of the level measuring device is reduced and made equal to $\Delta V_0$. In the case of the dot-dot-dash line B2, the theoretically corrected value of positive feedback ratio is made smaller than the reference value such that the difference $\Delta V$ in the output of the level measuring device is increased and made equal to $\Delta V_0$.

After that, the operation section 1403 obtains a ratio of the theoretically corrected value of positive feedback ratio described above to the reference value of positive feedback ratio. As described in connection with FIG. 8, in the case that the difference $\Delta V$ in the output of the level measuring device, which corresponds to the known value of amplitude $S_0$ is greater than $\Delta V_0$, the above-described ratio of the theoretically corrected value of positive feedback ratio to the reference value of positive feedback ratio is greater than 1 (100%). In the case that the difference $\Delta V$ in the output of the level measuring device, which corresponds to the known value of amplitude $S_0$ is smaller than $\Delta V_0$, the above-described ratio of the theoretically corrected value of positive feedback ratio to the reference value of positive feedback ratio is smaller than 1 (100%).

Figure 9:
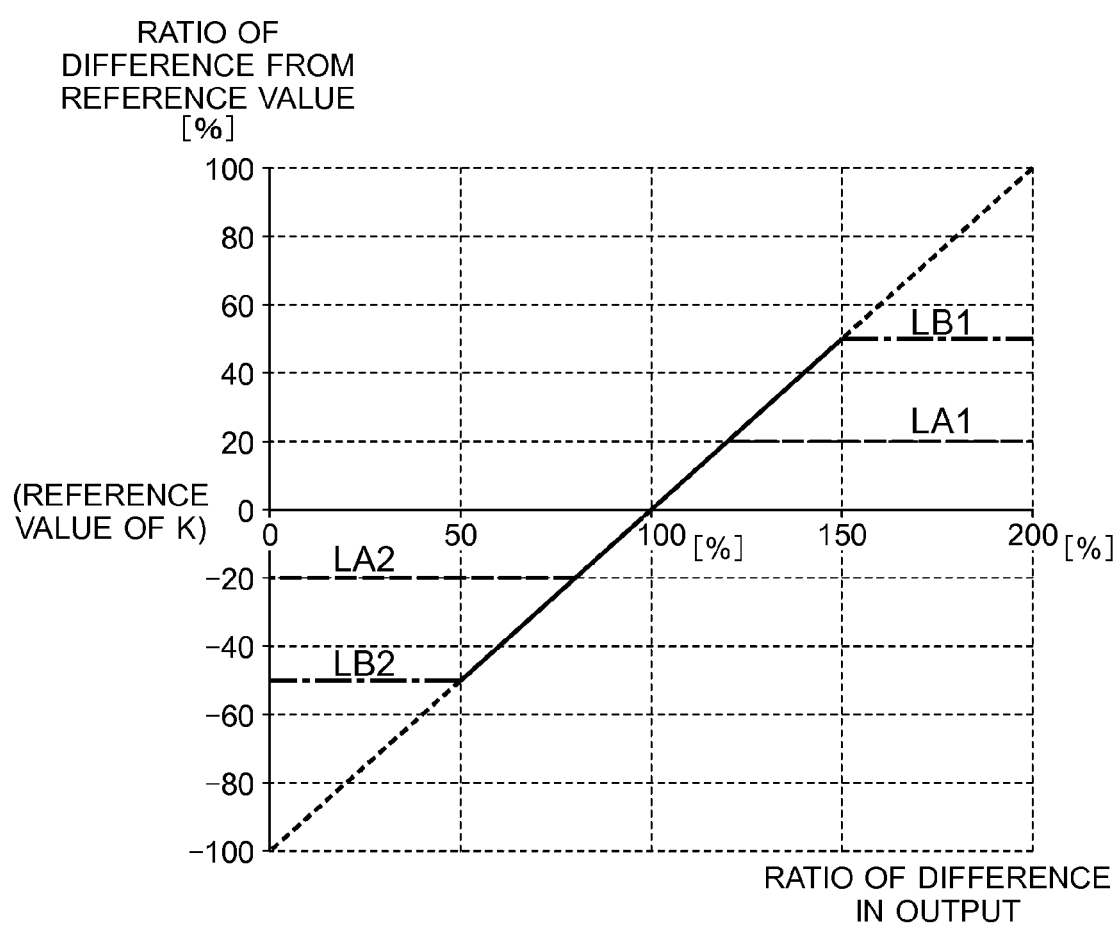
FIG. 9 shows a relationship between a ratio of the difference $\Delta V$ in the output of the level measuring device, which corresponds to the known value of amplitude $S_0$ to $\Delta V_0$ and a ratio of the theoretically corrected value of positive feedback ratio to the reference value of positive feedback ratio.

FIG. 9 shows a relationship between a ratio of the difference $\Delta V$ in the output of the level measuring device, which corresponds to the known value of amplitude $S_0$ to $\Delta V_0$ and a ratio of the theoretically corrected value of positive feedback ratio to the reference value of positive feedback ratio. The horizontal axis of FIG. 9 represents a ratio of difference $\Delta V$ in the output of the level measuring device, which corresponds to the known value of amplitude $S_0$ to $\Delta V_0$, while the vertical axis of FIG. 9 represents a ratio of theoretically corrected value of positive feedback ratio to the reference value of positive feedback ratio.

In step S1040 of FIG. 7, the positive feedback ratio correcting section 1405 corrects the positive feedback ratio of the feedback impedance 1205. The positive feedback ratio correcting section 1405 is provided with a limiter for limiting a corrected value of positive feedback ratio within a predetermined range including the above-described reference value. LA1 and LB1 in FIG. 9 represent upper limits of the limiter, while LA2 and LB2 represent lower limits of the limiter. The positive feedback ratio correcting section 1405 may be configured to automatically change positive feedback ratio within the above-described predetermined range. Alternatively, the positive feedback ratio correcting section 1405 may be configured such that the operator who has recognized the deviation of measurement by the display section 160 can determine the necessity and an amount of correction and can send command for the correction through the input section 170.

The positive feedback ratio correcting section 1405 may be configured to change the upper and lower limits of the limiter, that is, the above-described predetermined range depending on a period of mold oscillation. More specifically, in the case of a longer period, the above-described predetermined range is made narrower than in the case of a shorter period. In FIG. 9, an example of the upper and lower limits of positive feedback ratio in the case of a longer period is shown by LA1 and LA2, while an example of the upper and lower limits of positive feedback ratio in the case of a shorter period is shown by LB1 and LB2.

The reason that in the case of a longer period, the predetermined range is made narrower than in the case of a shorter period is as below. In the case of a longer period (for example, in the case of 60 cycles per minute), frequency of the calibration is smaller and reliability of the calibration is lower than in the case of a shorter period (for example, in the case of 240 cycles per minute). Accordingly, the range of the limiter is made smaller in order to enhance stability and to promote safety.

The positive feedback ratio correcting section 1405 may be configured such that it resets the value of positive feedback ratio to the reference value independently of the period of mold oscillation when a ratio of the difference $\Delta V$ in the output of the level measuring device, which corresponds to the known value of amplitude $S_0$ to $\Delta V_0$ does not come within a predetermined range (for example, ±100%) within a predetermined period (for example, the period of calibration) after the positive feedback ratio correcting section 1405 has corrected the value of positive feedback ratio. According to an experiment which uses the present measuring device, when an amount of deviation (the above-described ratio of difference $\Delta V$ to $\Delta V_0$) exceeds ±100% after the value of positive feedback ratio has been corrected in calibration, calibration is completed in a shorter time in the case that at first the value of positive feedback ratio is reset to the reference value and then calibration is carried out than in the case that calibration is continued without resetting the value of positive feedback ratio.

In step S1050 of FIG. 7, the mold oscillation signal calibration section 140 determines whether the MOSC is to be completed or not. The mold oscillation signal calibration section 140 determines a point in time when the MOSC is terminated by the use of the above-described signal which represents the cyclic movement of mold oscillation. If the MOSC is terminated, the process is terminated. If the MOSC is not terminated, the process goes to S1020.

In the MOSC, a high accuracy is achieved because calibration is carried out using an amount of change in the output of the eddy current mold level measuring device and a known value of amplitude of mold oscillation. Further, according to the MOSC, calibration can be successively carried out during a time period of withdrawal as shown in FIG. 6. Accordingly, the MOSC is sufficiently adaptable to dynamic disturbances such as a change in vertical position of the tundish and a change in width of a slab mold. Thus, the MOSC makes it possible to realize a mold level measuring device which has a sufficiently high accuracy and is adaptable to the dynamic disturbances. Further, since the calibration is carried out by the use of output of the eddy current mold level measuring device itself, other types of level measuring devices such as a thermocouple type mold level meter and an electrode type mold level meter are not required.

Further, since in a mold level measuring device and a mold level measuring method according to an embodiment of the present invention, a corrected value of positive feedback ratio is limited within a predetermined range including the reference value, calibration is prevented from making the operation unstable. Accordingly, calibration can be carried out with reliability and high accuracy can be maintained.

What is claimed is:

1. A mold level measuring method for measuring a level of molten metal in a mold by an eddy current mold level measuring device, the method comprising the steps of:
    determining a reference value of a positive feedback ratio of an amplifying section of the measuring device in environmental conditions before pouring of molten metal into the mold;
    detecting, by a coil of the measuring device, a change in a value of impedance caused by a change in mold level;
    amplifying, by the amplifying section, a voltage corresponding to the change in the value of impedance;
    obtaining a standard value of difference in an output of the measuring device, the standard value of difference corresponding to a known value of amplitude of mold oscillation when the positive feedback ratio is the reference value, to obtain a deviation of measurement based on a difference between the maximum value and the minimum value of the output of the measuring device during a time period of mold oscillation and the standard value of difference; and
    correcting the positive feedback ratio so as to reduce the deviation of measurement independently of the reference value while the corrected positive feedback ratio is maintained within a predetermined range including the reference value and so as to limit the corrected positive feedback ratio within the predetermined range.

2. A mold level measuring method according to claim 1, wherein the predetermined range is changed depending on a period of mold oscillation.

3. A mold level measuring method according to claim 1, wherein the difference between the maximum value and the minimum value of the output of the measuring device and the deviation of measurement are successively obtained during the time period of mold oscillation.

4. A mold level measuring method according to claim 1, wherein the output of the measuring device which has passed through a filter configured to detect components of mold oscillation alone is used in the step of obtaining the standard value of difference.

5. A mold level measuring method for measuring a level of molten metal in a mold by an eddy current mold level measuring device, the method comprising the steps of:
    determining a reference value of a positive feedback ratio of an amplifying section of the measuring device in environmental conditions before pouring of molten metal into the mold;
    detecting, by a coil of the measuring device, a change in a value of impedance caused by a change in mold level;
    amplifying, by the amplifying section, a voltage corresponding to the change in the value of impedance;
    obtaining a standard value of difference in an output of the measuring device, the standard value of difference corresponding to a known value of amplitude of mold oscillation when the positive feedback ratio is the reference value, to obtain a deviation of measurement based on a difference between the maximum value and the minimum value of the output of the measuring device during a time period of mold oscillation and the standard value of difference; and
    correcting the positive feedback ratio so as to reduce the deviation of measurement while the positive feedback ratio is maintained within a predetermined range including the reference value,
    wherein the positive feedback ratio is reset to the reference value when the deviation of measurement does not come into a predetermined range within a predetermined time period after the positive feedback ratio has been corrected.

\* \* \* \* \*